United States Patent [19]
Sato

[11] Patent Number: 6,076,023
[45] Date of Patent: Jun. 13, 2000

[54] PHYSICAL DISTRIBUTION STORAGE SYSTEM

[75] Inventor: Miyuki Sato, Kawasaki, Japan

[73] Assignee: Fujitsu Limited, Kawasaki, Japan

[21] Appl. No.: 08/999,856

[22] Filed: Dec. 24, 1996

Related U.S. Application Data

[63] Continuation of application No. 08/314,273, Sep. 30, 1994, abandoned.

[30] Foreign Application Priority Data

Dec. 21, 1993 [JP] Japan .................................. 5-322148

[51] Int. Cl.[7] ..................................................... G06F 19/00
[52] U.S. Cl. ........................... 700/214; 700/83; 700/215; 414/273
[58] Field of Search ..................................... 235/380, 381, 235/383; 700/84, 83, 214, 215, 216; 414/266, 267, 273

[56] References Cited

U.S. PATENT DOCUMENTS

| | | | |
|---|---|---|---|
| 4,141,078 | 2/1979 | Bridges, Jr. et al. | 364/403 |
| 4,419,734 | 12/1983 | Wolfson et al. | 364/567 |
| 4,641,753 | 2/1987 | Tamada | 209/546 |
| 4,672,553 | 6/1987 | Goldberg | 364/478 |
| 4,673,932 | 6/1987 | Ekchian et al. | 340/825.54 |
| 4,679,149 | 7/1987 | Merz | 364/478 |
| 4,688,026 | 8/1987 | Scribner et al. | 340/572 |
| 4,783,740 | 11/1988 | Ishizawa et al. | 364/403 |
| 4,796,209 | 1/1989 | Burk | 364/559 |
| 4,821,197 | 4/1989 | Kenik et al. | 364/468 |
| 4,887,208 | 12/1989 | Schneider et al. | 364/403 |
| 4,920,488 | 4/1990 | Filley | 364/403 |
| 4,930,086 | 5/1990 | Fukasawa | 364/468 |
| 4,991,719 | 2/1991 | Butcher et al. | 209/3.3 |
| 5,006,996 | 4/1991 | Nakamura et al. | 364/478 |
| 5,231,566 | 7/1993 | Blutinger et al. | 364/401 |
| 5,241,467 | 8/1993 | Failing et al. | 364/401 |
| 5,319,544 | 6/1994 | Schmerer et al. | 364/403 |
| 5,340,262 | 8/1994 | Tsujimoto et al. | 414/273 |
| 5,424,524 | 6/1995 | Ruppert et al. | 235/462 |

*Primary Examiner*—Paul P. Gordon
*Attorney, Agent, or Firm*—Staas & Halsey LLP

[57] ABSTRACT

A physical distribution storage system comprises a series of storage racks, a host processing unit and hand-held terminals, the storage racks storing articles and each storage rack having rack information indication means which indicates information concerning the articles stored in the rack. The host processing unit includes a printer which prints in and out lists, indicating articles to be taken in and out, on the print material. Each hand-held terminal includes an input unit which reads the rack information and the in and out lists and updates the in and out lists according to the in and out operations, a data comparator which compares the rack information read by the input unit with the updated in and out lists and a display which displays the comparator results on a respective screen. The in and out lists may be represented by two dimensional bar codes.

25 Claims, 11 Drawing Sheets

Fig.1A

JAN

ITF

Fig.1D

CODE39

Fig. 1E

PDF417

Fig. 1F

DATACODE

Fig. 1G

VERICODE

CODE16K

| A-1 | 123456 | ABCD COOKIE(CHOCO.) |
| A-2 | 123457 | ABCD COOKIE(VANILLA) |
| A-3 | 123458 | ABCD COOKIE(STRAWBERRY) |

⋮

| C-3 | 211111 | LMN COOKIE |

Fig. 6C
```
READ THE BAR CODE OF
THE PICKING LIST.
```

Fig. 6D
```
READ THE BAR CODE OF
THE RACK.
```

Fig. 6E
```
NOW, PICKING IS FINISHED.
```

Fig. 6F
```
POSITION     CODE        NAME
B-2          555555      XYZ CANDY
C-2          777333      PQR PIE
ARE NOT PICKED.
```

Fig. 6G
```
READ THE BAR CODE OF
THE NEXT RACK.
IF FINISHED, PUSH "FINISH"
```

Fig. 6H
```
A-1 123'456 ABCD COOKIE
              (CHOCOLATE)
     READ ITS BAR CODE
```

Fig. 6I
```
A-1 123456 ABCD COOKIE
              (CHOCOLATE)
            N.G.
       PLEASE RETRY
```

Fig. 6J
```
A-1 123456 ABCD COOKIE
              (CHOCOLATE)
     O.K.   QTY. 5
THESE ARE DELETED FROM
THE PICKING LIST
```

Fig.7

| POSITION | CODE | NAME |
|---|---|---|
| A-1 | 123456 | ABCD COOKIE (CHOCOLATE) |
| A-2 | 123457 | ABCD COOKIE (VANILLA) |
| ⋮ | | |

```
A-1 123456 ABCD COOKIES
              (CHOCOLATE)
O.K.   QTY. 5
AFTER PICKING, PUSH "FINISH"
FOR CONFIRMATION
```

PHYSICAL DISTRIBUTION STORAGE SYSTEM

This application is a continuation of application Ser. No. 08/314,273, Sep. 30, 1994, now abandoned on Dec. 14, 1996.

BACKGROUND OF THE INVENTION

1. Field of the Invention

The present invention relates to a storage system for storing articles in warehouses, etc. Particularly, the present invention relates to a storage system in which storage articles are taken in and out of the storage system according to indications output from hand-held terminals.

2. Description of the Related Art

In conventional management systems for stored articles in warehouses or stock goods in stores, operators confirm the existence of articles arranged on racks according to forms on which articles to be taken in and out are indicated, then the operators take the articles to the corresponding racks or take them from the racks. The articles to be taken in and out are recorded on the forms. However, when these operations are carried out by people, there occurs a problem that articles are not correctly taken in and out because of human errors. Particularly, this problem becomes serious when many kinds of articles are stored. Further, in some systems, storage locations of articles are flexibly changed in order to effectively use storage spaces. In these systems, storage space from which all articles are taken out (i.e., removed) are used to store other articles. Therefore, because the storage locations of the articles frequently change, operators cannot easily look for the locations corresponding to the articles to be taken in and out. This increases the operation time. For example, in the warehouse used to store seasonal goods, stored articles change according to seasons; therefore, the storage locations of the articles must be changed according to these changes of the stored articles in order to effectively use the storage spaces.

Further, some kinds of articles, such as clothes, require special knowledge to discriminate. Therefore, when these articles are stored in the warehouse, it is not easy to correctly check the articles to be taken in and out. This also causes errors.

Computers can be used to manage the stored articles. The computer outputs a list which indicates articles to be taken in and out. In order to correctly and effectively take in and out articles, the articles themselves or the locations of the articles employ information indication means such as bar codes which indicate information concerning the stored articles in forms that can be converted into electrical signals; then, the articles are taken in and out after reading the information indication means by using bar code scanners, etc., provided at hand-held terminals. The communications between the host computer and the hand-held terminals are carried out by using radio communication means or by connecting the hand-held terminals to the host computer.

When the communications are carried out by using radio communication means, for example, a bar code of the article is read by the hand-held terminal, then, the bar code data read by the hand-held terminal is transmitted to the host computer. The host computer determines whether the received bar code data is in the list of articles to be taken in and out, then, the result is transmitted to the hand-held terminal. The hand-held terminal displays this result on its display device, and the operators carry out the operations by referring to this result. In this way, errors in the operations are reduced because the article to be taken in and out can be checked.

In the above operations, the checking operations used to take in articles are similar to those used to take out articles, therefore, the examples to take out articles will be explained in the following. The operations to take out articles from the warehouse and so forth are called "picking". Therefore, in the following, this word will be used.

However, in the above operations, the communication is carried out when the bar code is read by the hand-held terminal; therefore, there occur problems that the operations become complicated and the operation times become long.

When the hand-held terminals are connected to the host computer in order to communicate with the host computer, all the information necessary to carry out the picking operation is transmitted at one time. The hand-held terminal stores the information, then, when the bar code of the article is read, the hand-held terminal determines whether the received bar code data is in the list of articles to be picked and displays this result on its display apparatus. In this method, it is not necessary to communicate with the host computer when the bar code is read by the hand-held terminal. This method can be applied to the system using the radio communication means.

The hand-held terminals having radio communication means are very expensive; therefore, there occurs a problem that the storage system having these hand-held terminals becomes expensive. Further, because environments in which the radio communications can be freely carried out are limited, there exist some cases in which these systems cannot be used.

When the communications are carried out by connecting the hand-held terminals to the host computer, the hand-held terminals must be transferred to the location of the host computer whenever the communications between them must be carried out. Particularly, when the host computer is located apart from the storage system, the time necessary for round trips between them becomes long, then, the operation time becomes long.

Further, as described above, in some systems in which storage locations of articles are flexibly changed in order to effectively use storage spaces, the problem that the operation time is long cannot be resolved by using the bar codes which are attached to articles or locations of articles.

SUMMARY OF THE INVENTION

A first object of the present invention is to provide a physical distribution storage system in which articles or locations of the articles employ information indication means which indicate information concerning the stored articles in electrically readable forms, and the articles are correctly taken in and out by using the host computer and the hand-held terminals; further, information can be sent more easily between the host computer and the hand-held terminals.

A second object of the present invention is to provide a physical distribution storage system in which articles or locations of the articles employ information indication means which indicate information concerning the storage articles in electrically readable forms, and the storage locations of the articles can be more easily searched.

A physical distribution storage system according to the first aspect of the present invention comprises a series of storage racks, a host processing unit and hand-held terminals. The storage racks store articles and each storage rack includes rack information indication means which indicates information concerning the articles stored in the rack. The host processing unit includes printing means which prints in and out lists, indicating articles to be taken in and out, on printing material. The hand-held terminals include input means which read the rack information and the in and out lists; storage means which store the in and out lists and update the in and out lists according to the operations; data comparing means which compare the rack information read by the input means with the updated in and out lists; and display means which display the comparing results by the comparing means on respective screens.

The in and out lists should be represented by two dimensional bar codes.

The rack information indication means should also be two dimensional bar code labels.

Each hand-held terminal should further include rack information generating means which generate rack information and printing means which produces the rack information indication means by printing said rack information.

It is desired that the printing means of each hand-held terminal outputs the results of the operations indicated by said in and out lists, and the host processing unit includes input means for reading the operation results output from the hand-held terminals.

The data comparing means judges whether or not articles indicated by the rack information indication means are included in the in and out lists, and the display means displays the corresponding articles when articles, indicated by the rack information indication means, are included in the in and out lists.

The corresponding articles displayed on the display means are deleted from the in and out lists automatically or in response to an operator's indication.

The input means may be scanners and keyboards.

In the physical distribution storage system according to the first aspect of the present invention, the in and out lists are printed from the host processing unit onto print material in an electrically readable form, and the hand-held terminals can read the in and out lists. Therefore, the in and out lists can be communicated from the host processing unit to each hand-held terminal via the print material. As a result, when the in and out list is supplied from the host processing unit to each hand-held terminal, only print materials such as papers may be transferred unless the hand-held terminal is transferred to the host processing unit.

The in and out lists require a considerable amount of information when a plurality of articles to be taken in and out are indicated. If bar codes are used to represent the in and out list, it is necessary to use bar codes which represent a considerable amount of information. Therefore, it is necessary to use two dimensional bar codes.

A physical distribution storage system according to a second aspect of the present invention comprises a series of storage racks for storing articles, the articles being hierarchically managed according to the distribution of the articles in respective storage racks and the distribution of the storage racks. Each management unit for the respective hierarchies includes bar codes indicating all the articles stored in the management unit.

When the management unit is included in a higher hierarchy, the number of the articles included in this management unit becomes large; therefore, the amount of information to be represented in the bar code of this management unit becomes large. In the physical distribution storage system according to a second aspect of the present invention, by using bar codes which can represent a large amount of information, the bar code of the management unit can represent information of all articles included in this management unit. In this way, if the storage locations of articles can be hierarchically indicated according to the distribution of the articles in respective storage racks and the distribution of the storage racks, the articles can be found more easily.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

As described above, the checking operations to take in articles are similar to those to take out articles; therefore, the examples to take out articles, namely, picking operations will be mainly explained in the following. However, the present invention is not limited to the picking operations.

FIGS. 1A to 1H are diagrams showing examples of bar codes, FIGS. 1A to 1D show one dimensional bar codes, and FIGS. 1E to 1H show two dimensional bar codes. In general, the amount of information which the two dimensional bar codes can represent is about one hundred times as large as that of the one dimensional bar codes.

Figure 1A:
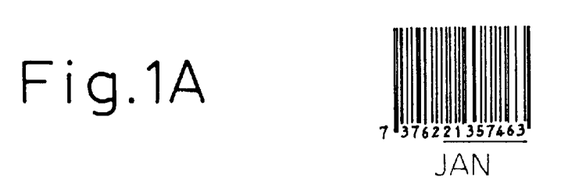
FIGS. 1A, 1B, 1C, 1D, 1D, 1E, 1F, 1G, and 1H, are diagrams showing examples of bar codes.
Figure 1B:
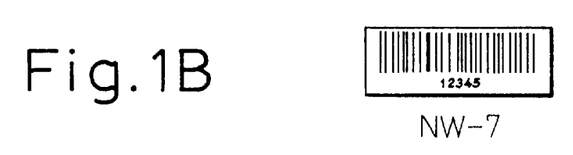
Figure 1C:
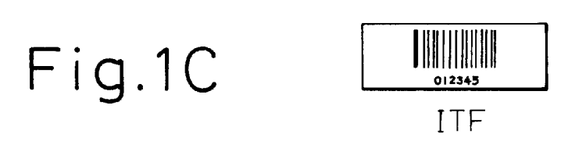
Figure 1D:
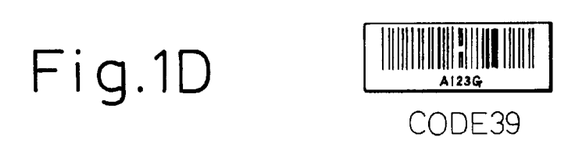
Figure 1E:
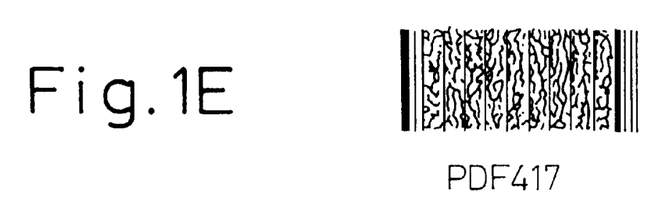
Figure 1F:
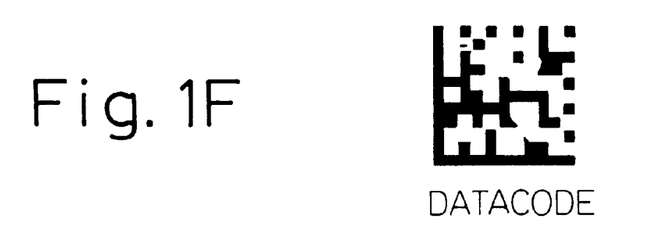
Figure 1G:
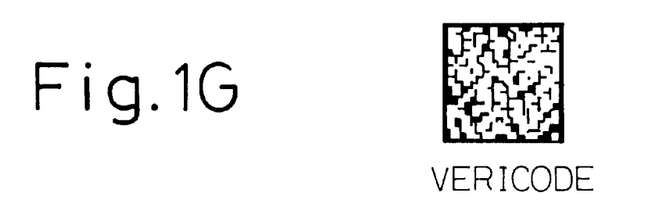
Figure 1H:
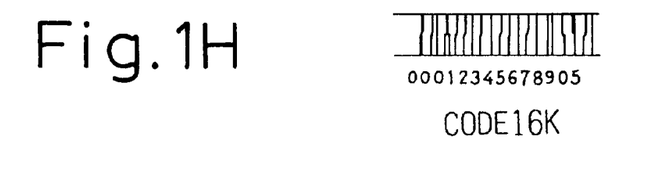
Figure 2:
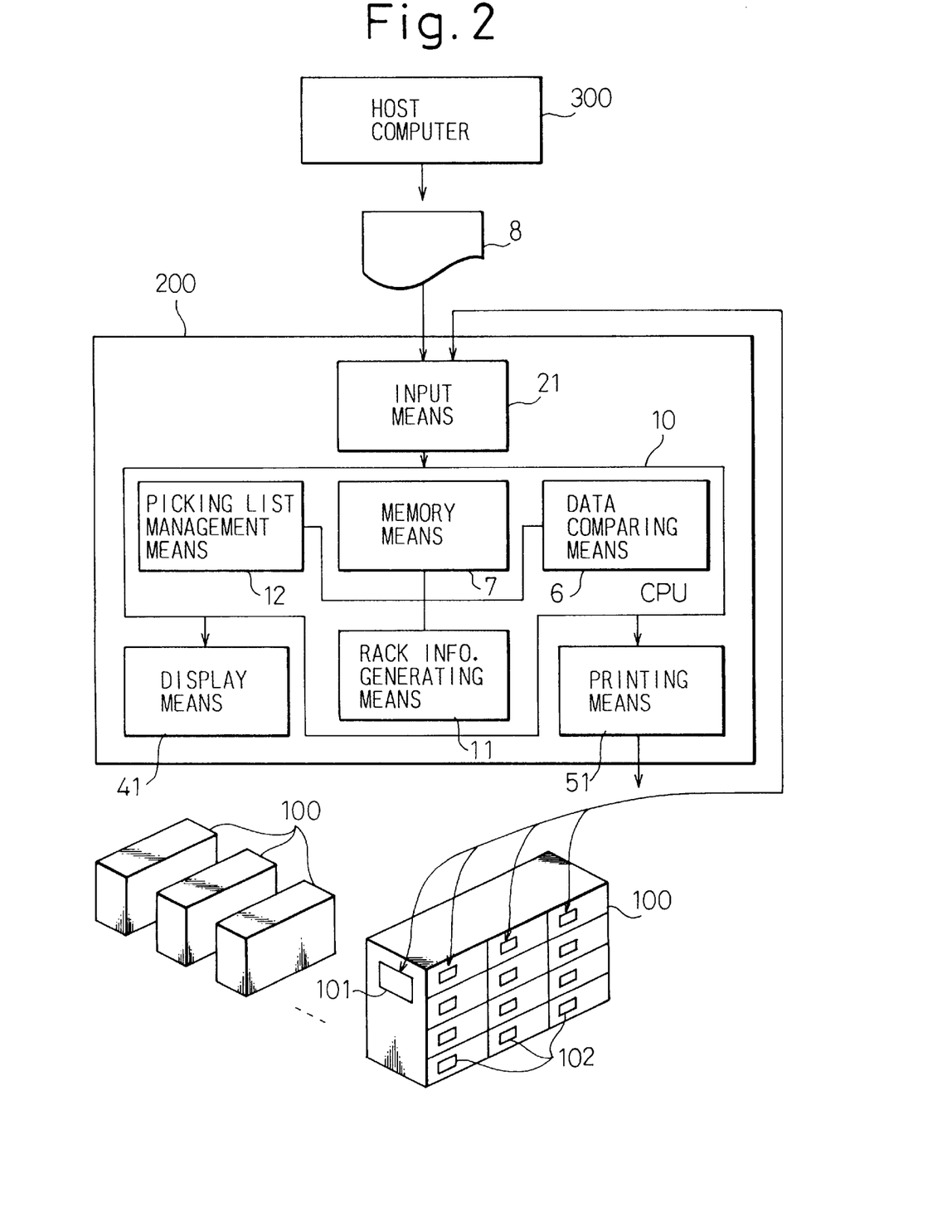
FIG. 2 is a diagram showing a total constitution of a storage system of an embodiment of the present invention.
Figure 3:
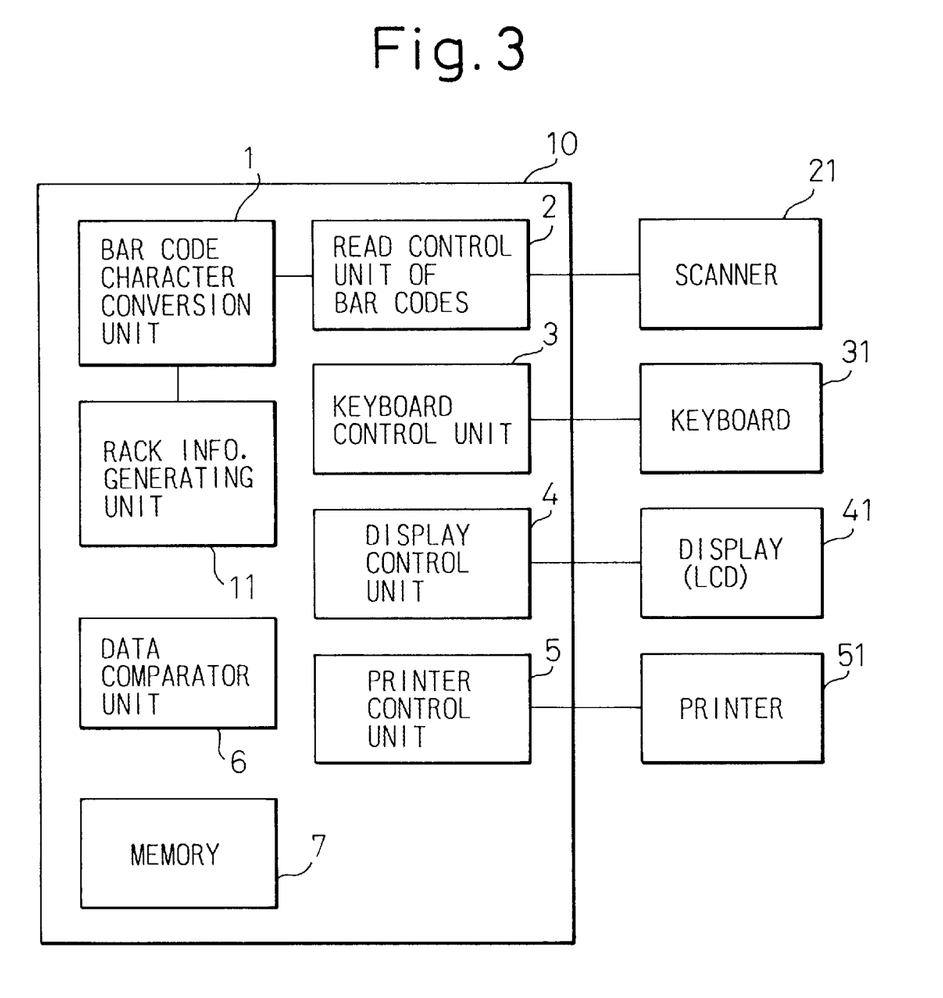
FIG. 3 is a block diagram showing a constitution of a hand-held terminal of the embodiment.

FIG. 2 shows a total constitution of a physical distribution storage system of a first embodiment of the present invention. FIG. 3 is a detailed block diagram of the hand-held terminal of the first embodiment. In FIG. 3, portions having functions similar to those of elements shown in FIG. 2 are indicated by the same reference numeral.

In FIG. 2, reference numerals 100 indicate racks which store articles. The racks 100 are hierarchically arranged. Each rack includes a plurality of storage spaces, and each storage space stores the same article. Several storage spaces may store a common article. Each rack includes a bar code label 101 which indicates information concerning the articles stored in the rack. This information corresponds to the rack information. The bar code label 101 is attached to the rack. The bar code labels 101 correspond to the rack information indication means. The bar code on each bar code label 101 is two dimensional bar code. If an amount of the rack information is too large to be represented by only one two dimensional bar code, a plurality of two dimensional bar codes can be printed on the bar code label 101. In practice, as described later, characters indicating the rack information are also printed in order to allow an operator to directly check the rack information.

Each storage space of the rack 100 also includes a bar code label 102 which indicates information concerning the kind of article stored in it. This bar code label 102 may be directly provided on an article or on other elements corresponding to the articles. For example, when clothes are hung on hangers, bar code labels are attached to the hangers. The bar code on the bar code label 102 is also two dimensional bar code; however, this can be one dimensional bar code if the amount of information relating to each article is small. In practice, characters indicating the article are also printed.

A host computer 300 includes a printer. The printer outputs a picking list indicating articles to be taken in and out. The picking list is printed on paper 8. The picking list is represented by two dimensional bar codes.

As shown in FIG. 2, a hand-held terminal 200 includes input means 21; a central processing unit (CPU) 10; display means 41; and printing means 51. In the CPU 10, compises data comparing means 6, memory means 7, picking list management means 12, and rack information generating means 11. The input means 21 reads the bar codes printed on the labels 101, 102 and the bar code of the picking list. The memory means 7 stores the picking list read by the input means 21. The picking list management means 12 updates the picking list stored in the memory 7 according to the picking operations. Therefore, the storage means consists of the memory means 7 and the picking list management means 12. The data comparing means 6 compares the rack information read by the input means with the updated picking list. The display means displays the results output by the comparing means 6.

As described above, when storage locations for articles are flexibly changed in order to effectively use storage spaces, the rack information of each rack changes according to the picking operations regarding the rack. The rack information generating means 11 updates the rack information in response to these changes. The printing means 51 prints the updated rack information on a label. The old rack information label is removed, and the new label is attached to the rack.

As shown in FIG. 3, a scanner 21, a keyboard 31, a display (Liquid Crystal Display) 41, and a printer 51 are connected to the CPU 10. If necessary, a communication apparatus may be provided for communicating with the host computer 300. The scanner 21, the keyboard 31, the LCD 41, and the printer 51 are integral with the hand-held terminal 200, but they may be connected to the hand-held terminal 200 via cables. In order to control data input/output between these elements and the CPU 10, a bar code reading control unit 2, a keyboard control unit 3, a display control unit 4, and a printer control unit 5 are provided in the CPU 10. A bar code/character conversion unit 1 is provided to convert bar codes to characters or convert characters to bar codes.

The scanner 21 reads bar codes on the bar code labels 101, 102, and bar codes on the picking list. The bar code data read by the scanner 21 are stored in the memory 7. Therefore, the scanner 21 corresponds to the input means.

The keyboard 31 is used to input data which cannot input by the scanner 21. For example, commands to the hand-held terminal 200, and information for articles having no bar code are input to the hand-held terminal by using the keyboard 31. The keyboard 31 also includes a cancel key and a "finish" key.

The LCD 41 corresponds to the display means. Information presented to the operator is displayed on the LCD 41. For example, trade names, trade codes, storage locations, etc., are displayed. Further, information concerning the operational conditions of the hand-held terminal 200 and indications to the operator are displayed. As described later, a comparison between the picking list and the rack information is also displayed.

In this embodiment, the LCD is used as the display means; however, other display devices can be used. The display means is integral with or is used by being connected to the hand-held terminal 200; therefore, it is desired to be a compact display device such as a LCD or a plasma display device.

The printer 51 corresponds to the printing means. The printer 51 prints the updated rack information on the bar code label 101. If necessary, the printer 51 prints trade names, trade codes, etc., and indications to the operator.

The data comparing unit 6 compares the rack information read by the scanner 21 with the updated picking list. When the rack information indicates that articles to be taken out exist in the rack, the comparing means 6 outputs data concerning storage locations of the articles to the display control unit 4 and the picking list management means 12.

The display control unit 4 controls the LCD 41 to display the data. If necessary, the printer control unit 5 also controls the printer 51 to print a message to the operator. The picking list management means 12 automatically deletes the indicated articles from the picking list.

The memory 7 consists of ROM and RAM. The ROM stores programs which control the operations of the hand-held terminal 200. The RAM stores the picking list read by the scanner 21 and temporarily stores the rack information. The contents of the picking list is updated in the RAM.

Figure 4:
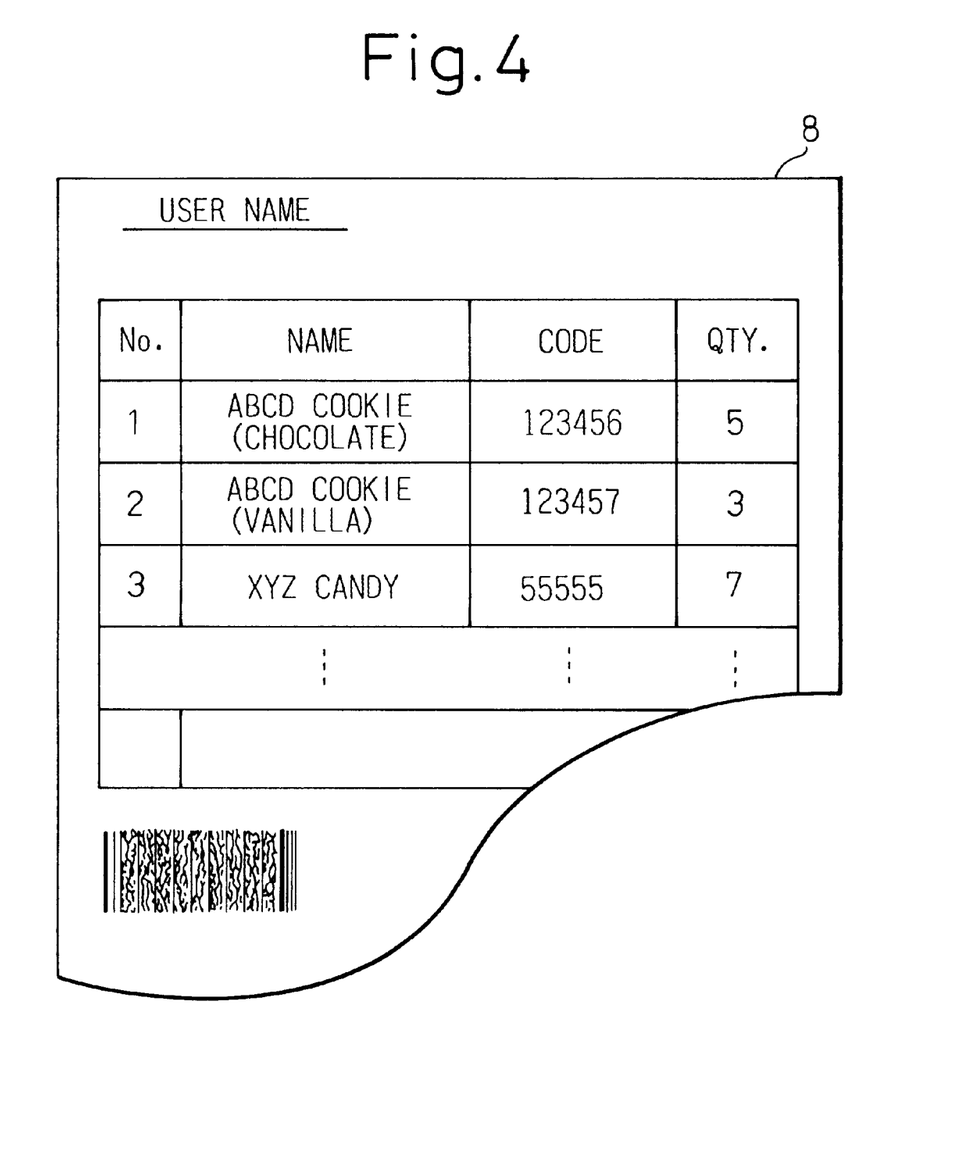
FIG. 4 is a diagram showing an example of a picking list used in the embodiment.

FIG. 4 shows an example of a picking list. As shown in FIG. 4, a form in which an user name, item numbers, trade names, trade codes, the number of articles, etc., are indicated is printed, and a two dimensional bar code indicating the contents of the table is also printed.

The host computer 300 generates picking list data according to information such as sales information sent from other computers and a cross reference between articles and their bar codes. A printer is provided in the host computer 300, and this printer outputs the above picking list.

The picking list data may be made in the host computer by the operator. For example, a scanner is provided in the host computer 300. The operator inputs bar codes of the articles to be taken out by using this scanner. Data, such as quantities of the articles which cannot be input by reading the bar codes of the articles, are manually input by using the keyboard of the host computer 300. In this way, the host computer 300 generates the picking list data.

Figure 5:
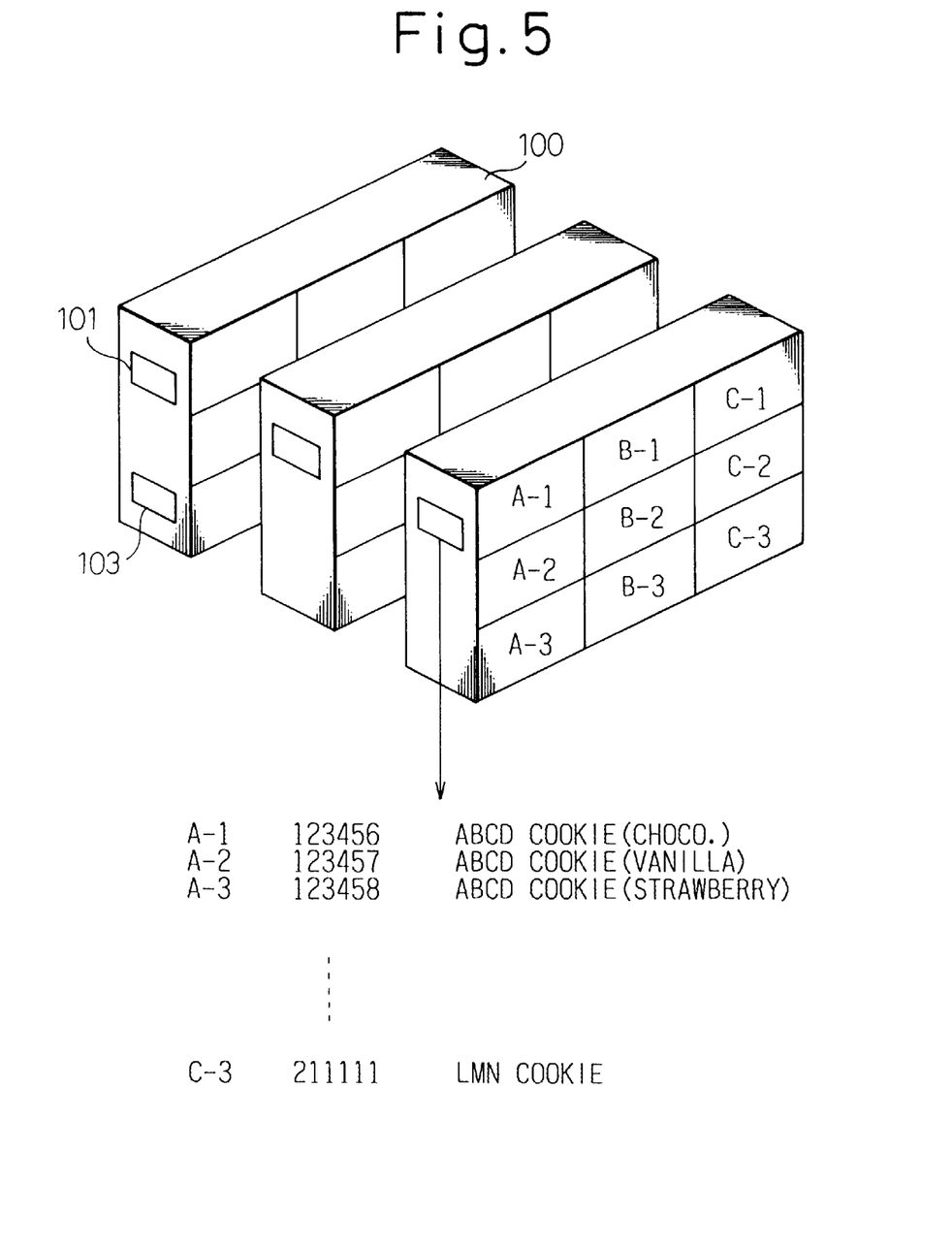
FIG. 5 is a diagram showing an arrangement of racks and bar codes according to the embodiment.

FIG. 5 shows a detailed constitution of the rack information indicated by the bar code of each bar code label 101.

In FIG. 5, the rack is divided into nine storage spaces. In each storage space, the same type articles are stored. The bar code on the label 101 indicates the rack information of the rack which includes trade codes, trade names, storage locations, etc., of the articles stored in the rack. The bar code on the label 101 is two dimensional bar code.

Although only three racks are shown in FIG. 5, there practically may exist a huge number of racks. These racks are hierarchically divided into groups in such a way that all racks are divided into a few primary groups, and the racks in the primary group are further divided into a few intermediate groups, and then, the racks in the intermediate groups are further divided into a few groups. One of the racks in each group has a bar code label whose bar code indicates information on the articles included in that group. The three racks shown in FIG. 5 are included in one group, and the bar code on the label 103 indicates information on the articles included in this group.

When articles are hierarchically managed according to the distribution of the articles in respective storage racks and distributions of the storage racks, it is easy to search for articles because the search can be hierarchically carried out.

For example, although the operator does not know the location of the articles indicated in the picking list, he can easily search the racks by reading the bar codes on the labels on the racks from high hierarchical level to low hierarchical level.

Figure 6A:
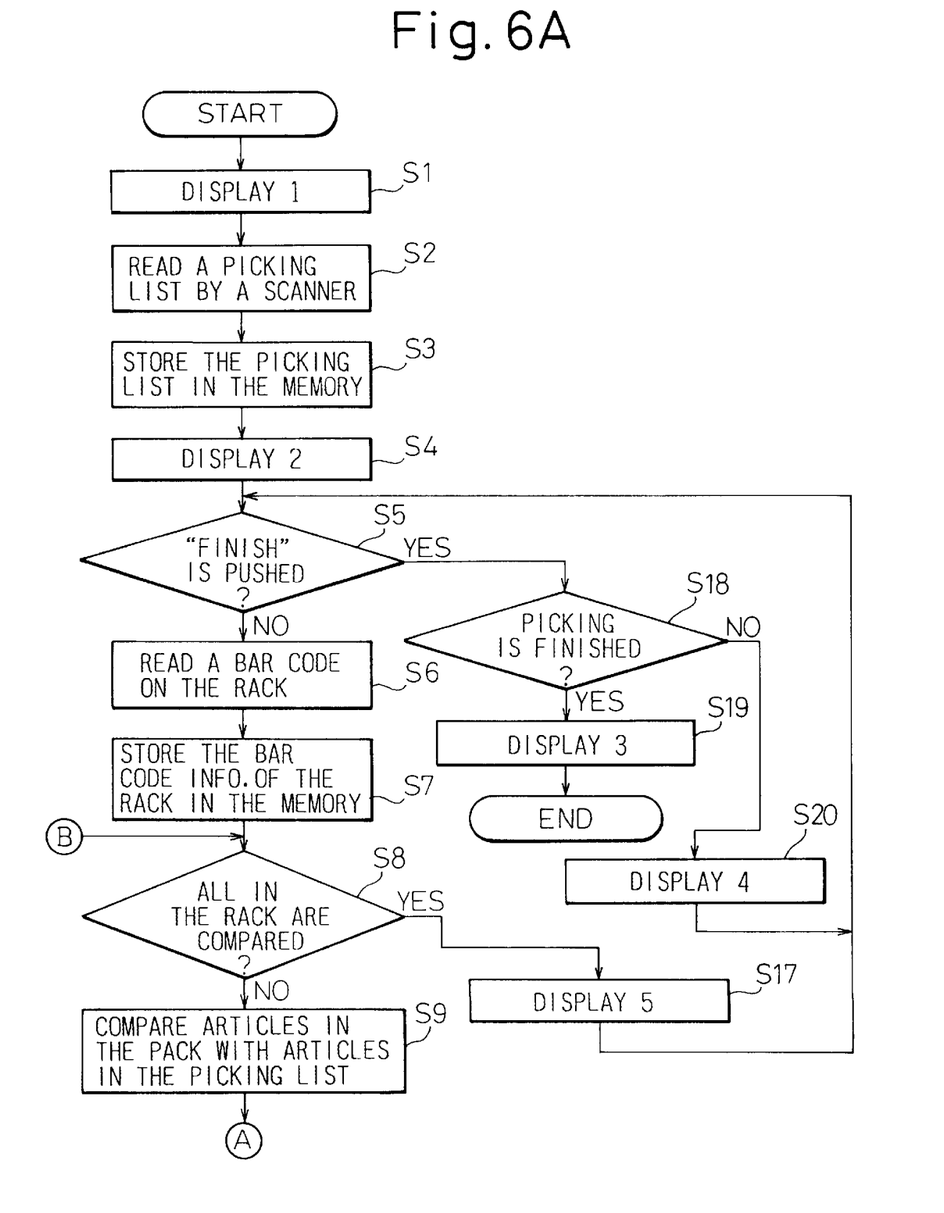
FIGS. 6A and 6B show a flowchart of a picking operation in the embodiment, and FIGS. 6C, 6D, 6E, 6F, 6G, 6H, 6I, and 6J, diagrams showing examples of display screens.
Figure 6B:
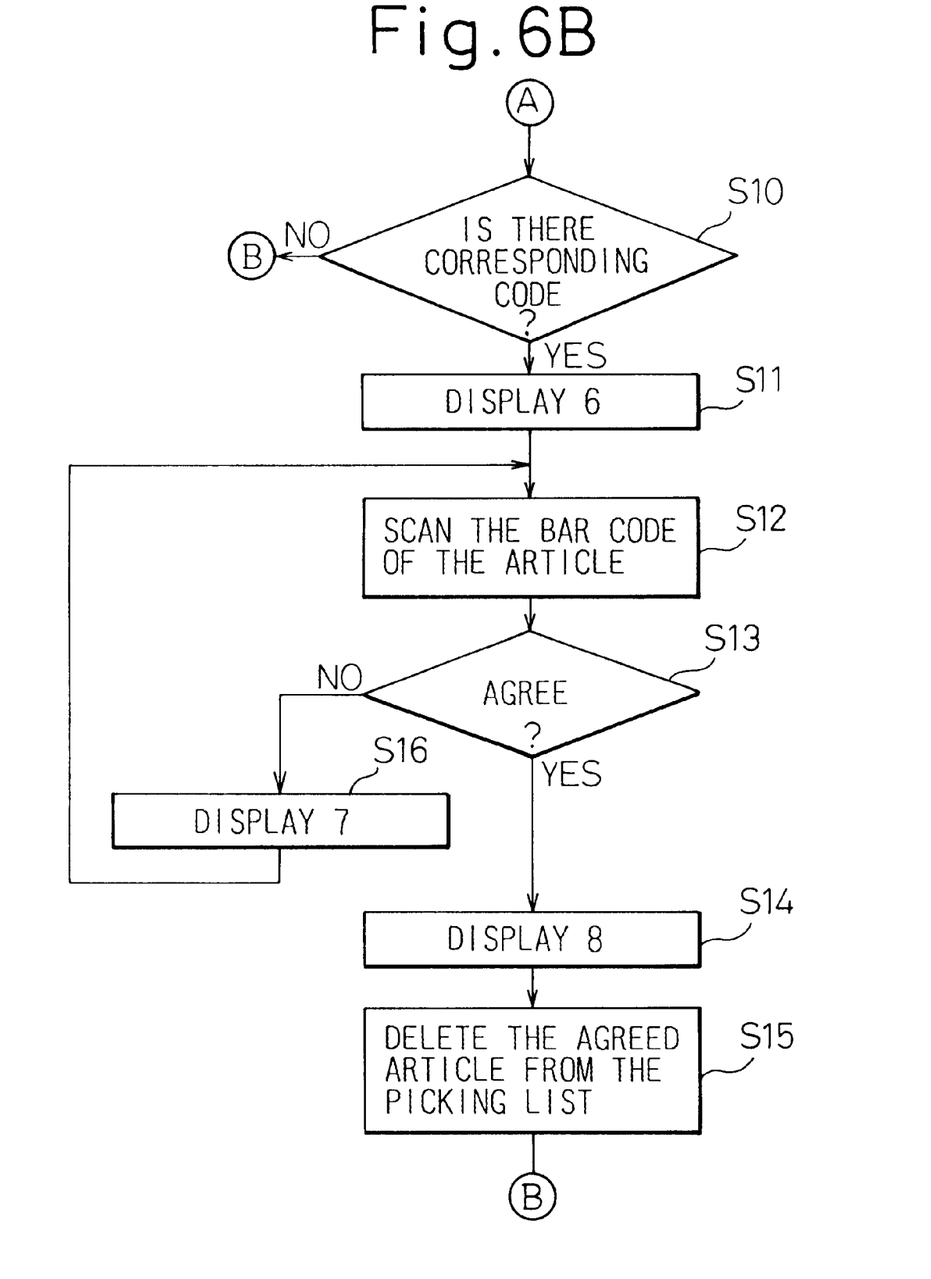

FIGS. 6A and 6B show a flowchart of a picking operation of the first embodiment. FIGS. 6C to 6J show a display screen displayed at steps of FIGS. 6A and 6B. The picking operation in the first embodiment will be explained with reference to FIGS. 6A and 6B.

Figure 6C:
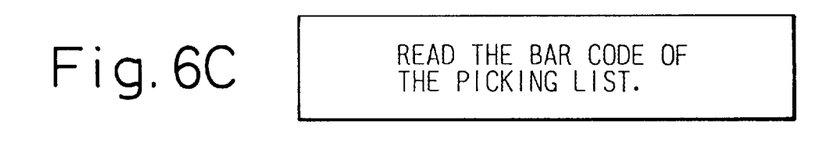

At step S1, the screen shown in FIG. 6C is displayed on the LCD 41. This display screen requires the operator to input the bar code of the picking list by using the scanner 21. In response to this indication, at step S2, the operator operates the scanner 21 so as to read the bar code. At step S3, the picking list read at the step S2 is stored in the memory 7.

Figure 6D:
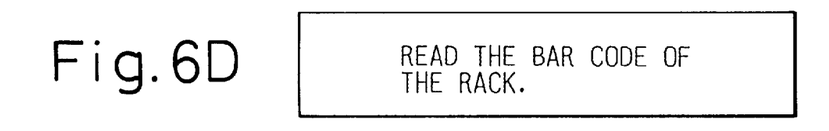

At step S4, the screen shown in FIG. 6D is displayed. This screen requires the operator to input the bar codes of the labels on the racks by the scanner 21.

At step S5, it is judged whether or not the operator indicates a completion of the picking operations. If the operator indicates the completion of the picking operation, the control proceeds to step S18. If the operator does not indicate the completion of the picking operation, the control proceeds to step S6. At first, because the completion of the operation is not indicated, the control proceeds to step 6.

At step S6, in response to the indication shown in FIG. 6D, the operator operates the scanner 21 to read the bar codes of the labels on the racks indicated by the picking list.

At step S7, the bar code data read by the scanner 21 are stored in the memory 7.

From step S8 to step S16, the articles in the picking list are searched for in the articles stored in the rack, whose rack information is read at the step S6.

At step S8, it is judged whether or not all articles in the rack, whose rack information is read at the step S6, are compared with the articles in the picking list. If all articles are already compared with the articles in the picking list, the control proceeds to step S17. If all articles are not compared yet, the control proceeds to step S9.

At step S9, one of the articles in the rack is compared with the articles in the picking list.

At step S10, it is judged whether or not the article in the rack is included in the picking list. If the picking list has no article corresponding to the article in the rack, the control returns to the step S8. If the picking list includes an article corresponding to the article in the rack, the control proceeds to step S11.

Figure 6E:
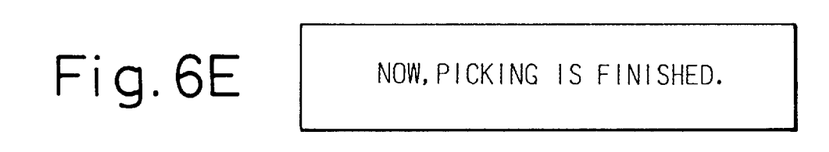
Figures 6F, 6G:
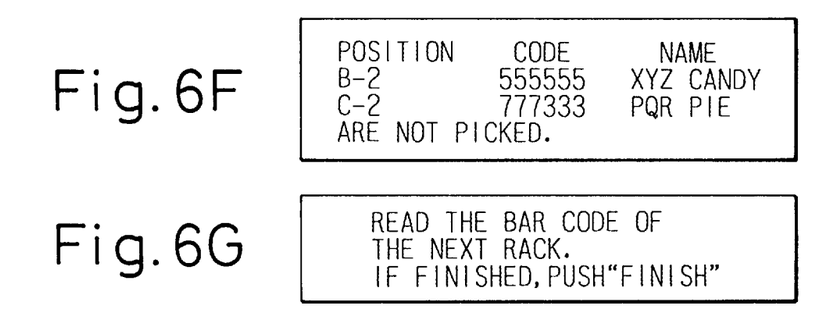
Figure 6H:
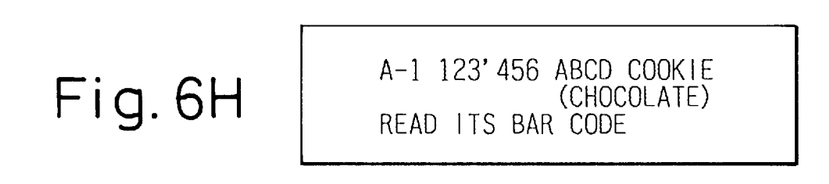

At step S11, the screen shown in FIG. 6H is displayed. This screen indicates the trade name and the trade code of the article to be taken out, and its storage location in the rack. This screen also indicates to the operator to input the bar code of the label of the storage space or of the article to be taken out.

At step S12, bar code of the label of the storage space or of the article is scanned by the scanner 21, and the bar code data read by the scanner is stored in the memory.

At step S13, it is judged whether or not the bar code of the article agrees with the bar code of the article indicated in the screen. If they do not agree with each other, the control proceeds to step S16. If they agree with each other, the control proceeds to step S14.

Figure 6I:
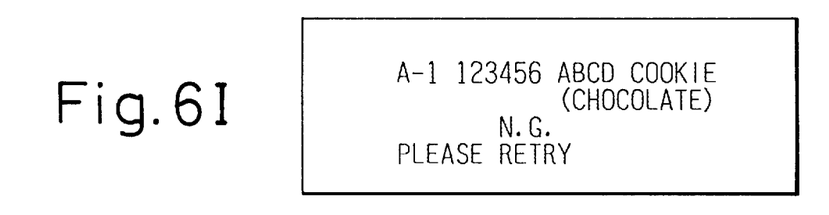

At step S16, the screen shown in FIG. 6I is displayed. This screen indicates that the article whose bar code is read is not the article to be taken out; therefore, it requires the operator to repeat the operation of step S12. In this way, the search operation is continued until the correct article is found.

Figure 6J:
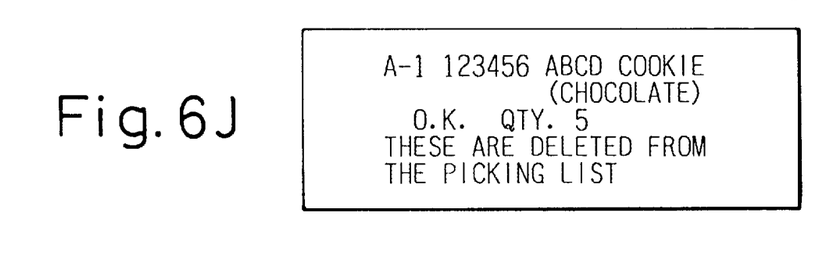

At step S14, the screen shown in FIG. 6J is displayed. This screen indicates that the article whose bar code is read is correct and they are deleted from the picking list. It also indicates a quantity of the articles to be taken out. In response to this display, the operator takes as many of the articles as are indicated.

At step S15, the articles displayed in FIG. 6J are deleted from the picking list. The control returns to step S8. In this way, all the articles which are indicated in the picking list and are included in the rack are picked.

As described above, at step S8, it is judged whether or not all articles in the rack, whose rack information is read at the step S6, are compared with the articles in the picking list. When all articles are compared, the control proceeds to step S17, and the screen shown in FIG. 6G is displayed. This screen requires the operator to read the bar code of the next rack. This screen also allows the operator to push the "finish" button of the keyboard when the picking operation is completed.

As described above, at step S5, it is judged whether or not the operator indicates a completion of the picking operations. In this way, the above operations are continued until the picking operation is completed.

When the operator indicates the completion of the picking operation, the control proceeds to step S18. At step S18, it is judged whether or not all articles in the picking list are deleted. When all articles in the picking list are deleted, the screen shown in FIG. 6E is displayed, and the picking operation is finished.

When some articles remain in the picking list, the control proceeds to step S20, and the screen shown in FIG. 6F is displayed. In this screen, articles remain in the picking list, and it is required that the operator completes the picking operation. Then, the control returns to step S5. In this way, the operations from step S5 are repeated until all the articles remained in the picking list are picked.

Further, as described above, when the storage locations of articles are flexibly changed in order to effectively use storage spaces, the rack information on each rack changes according to the picking operations. The rack information generating means 11 updates the rack information in response to these changes.

In practice, when the operations shown in FIGS. 6A and 6B are finished, the operator judges whether or not it is necessary to change the contents of the rack information generating means 11. Namely, it is judged whether or not storage spaces, from which all articles are taken out, exist. If such storage spaces exist, a new bar code for the rack, which indicates that such storage spaces are open, is made and it is attached to the rack. Practically, the bar code of the rack at the present time is input to the hand-held terminal 200 by using the scanner 21. Then, items of the articles, all of which are taken out, are deleted from the articles of the rack. These operations to update the contents of the rack information generating means 11, namely, to update the bar codes of the rack, are frequently carried out when articles are taken in the storage system.

Further, when the picking operation is completed, the operator usually informs the results of the operation to the host computer. For example, when the articles indicated by the picking list are not stored in the system, these results are informed. This information can be sent by using the bar codes. The hand-held terminal outputs these results as bar codes; then, the host computer 300 reads these bar codes. In this way, the host computer 300 receives the results of the picking operations.

In the operations of the above steps S9 to S11, one of the articles in the rack is compared with the picking list; then, only one article is displayed when it exists in the picking list. In response to this indication, the indicated article is taken out by the operator. These operations are repeated until all articles in the rack are checked. However, these operations can be changed in the following ways.

Figure 7:
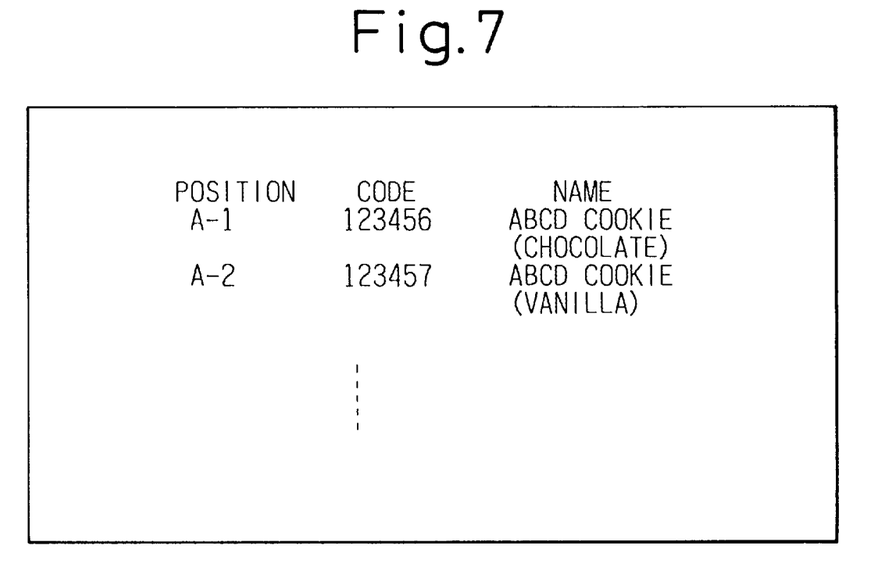
FIG. 7 is a diagram showing an another example of the display screen of the first embodiment.

At first, all articles in the rack are compared with the picking list. When some articles in the rack are included in the articles in the picking list, they are displayed at the same time. FIG. 7 shows an example of this display. In this case, the operations from steps S12 to S16 are carried out in the same way described above.

In the operations of the above steps S14 and S15, the article displayed in FIG. 6J is automatically deleted from the picking list because it is predicted that the operator will properly take it out. However, the article may be deleted after the operator actually takes it out and indicates to the hand-held terminal that the indicated article is taken out. In a second embodiment, these operations are carried out.

Figure 8:
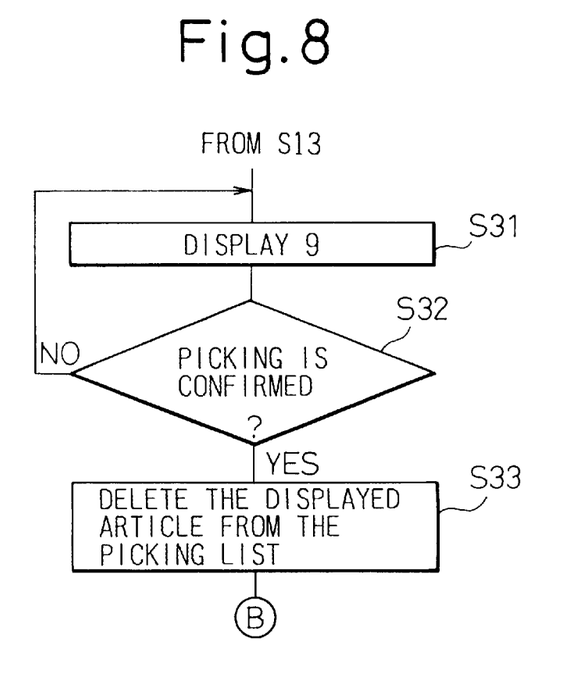
FIG. 8 is a diagram showing a part of a flowchart of a picking operation of the second embodiment.

Operations of the second embodiment are almost the same as those of the first embodiment except the operations of steps S14 and S15. FIG. 8 shows operations of the second embodiment corresponding to the operations of steps S14 and S15 of the first embodiment.

Figure 9:
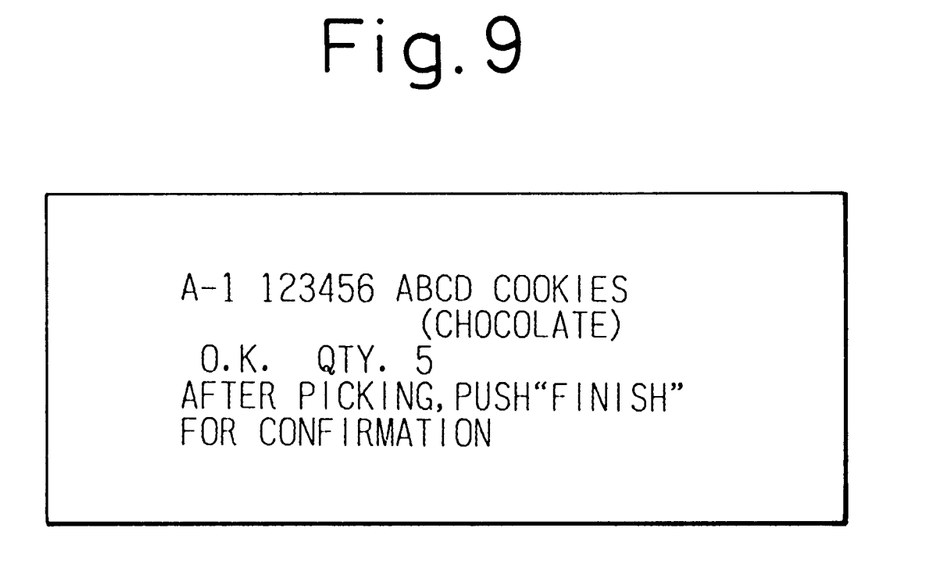
FIG. 9 is a diagram showing an example of the display screen of the second embodiment.

As shown in FIG. 8, at step 31, the screen shown in FIG. 9 is displayed. This screen also indicates that the article whose bar code is read is correct, and it indicates a quantity of the articles to be taken out. Further, it requires the operator to push the "finish" button of the keyboard after he takes out the article.

At step S32, it is judged whether the "finish" button is pushed. The control waits until the "finish" button is pushed.

In response to the "finish" indication, at step S33, the displayed article is deleted from the picking list. The control returns to step S8.

The present invention is applicable to various modifications different from the above-mentioned embodiments. For example, the picking list obtained by reading the bar codes and the results of the picking operations may be directly sent from the hand-held terminal to delivery points or physical distribution centers. Further, the keyboard may be replaced with the display having touch sensors.

As described above, according to the present invention, in the physical distribution storage system in which articles or locations of the articles employ information indication means which indicate information concerning the stored articles in a machine-readable form, and the articles are correctly taken in and out by using the host computer and the hand-held terminals, information can be sent more easily between the host computer and the hand-held terminals by a simple mechanism.

Further, according to the present invention, in the physical distribution storage system in which articles or locations of the articles employ information indication means which indicate information concerning the storage articles in a machine-readable form, the storage locations of the articles can be more easily searched.

What is claimed is:

1. A physical distribution storage system comprising:
    a series of storage racks which store articles, each article stored in one of said storage racks or each space of said storage racks, in which a common kind of articles is stored, has associated therewith article information indication means for indicating information concerning, respectively, said article or said common kind of articles stored in said space;
    a host processing unit, including a printing unit which prints in and out lists, providing an indication of articles to be taken in and out, on print material; and
    a hand-held terminal comprising input means for reading said in and out lists, storage means for storing said in and out lists and updating said stored in and out lists according to in and out storage operations, a data comparator which compares the article information read by said input means with said updated in and out lists and produces a comparator output, and a display which displays thereon the indication provided by said in and out lists and the comparator output of said data comparator.

2. A physical distribution storage system as set forth in claim 1, wherein said in and out lists printed by said printing unit of said host processing unit are represented by two dimensional bar codes.

3. A physical distribution storage system as set forth in claim 1, wherein said article information indication means comprises printed matter.

4. A physical distribution storage system as set forth in claim 3, wherein said article information indication means comprises two dimensional bar code labels.

5. A physical distribution storage system as set forth in claim 1, wherein
    said storage racks respectively have associated therewith rack information indication means for indicating information concerning the articles stored in said rack.

6. A physical distribution storage system as set forth in claim 5, wherein said rack information indication means comprises printed matter.

7. A physical distribution storage system as set forth in claim 6, wherein said rack information indication means comprises two dimensional bar code labels.

8. A physical distribution storage system as set forth in claim 6, wherein each hand-held terminal further has associated therewith rack information generating means for generating rack information and printing means for printing said rack information indication means by printing said rack information, generated by said rack information generating means, on print material.

9. A physical distribution storage system as set forth in claim 8, wherein said printing means in each hand-held terminal outputs the results of the in and out operations indicated by said in and out lists, and
    said host processing unit includes input means for reading said results of the in and out operations output from said hand-held terminals.

10. A physical distribution storage system as set forth in claim 1, wherein said data comparator judges whether or not articles, indicated by said rack information indication means, are included in said in and out lists and said display displays information of the corresponding articles which are indicated by said rack information indication means to be included in said in and out lists.

11. A physical distribution storage system as set forth in claim 10, wherein said information of the corresponding articles, displayed on said display, is automatically deleted from said in and out lists.

12. A physical distribution storage system as set forth in claim 10, wherein said information of the corresponding articles, displayed on said display, is deleted from said in and out lists in response to an operator's indication.

13. A physical distribution storage system as set forth in claim 1, wherein said input means comprises at least a selected one of a scanner and a keyboard.

14. A hand-held terminal for use in taking in and out articles, stored in a series of storage racks, according to in and out lists printed on print material and indicating articles to be taken in and out, comprising:

article information indication means, associated with each article stored in one of said storage racks or with each space of said storage racks in which a common kind of articles is stored, for indicating information concerning, respectively, said article or said common kind of articles stored in said space;

input means for reading said in and out lists;

storage means for storing said in and out lists and updating said stored in and out lists according to in and out storage operations;

a data comparator which compares the article information read by said input means with said updated in and out lists and produces a comparator output; and display means for displaying thereon indications according to said in and out lists and the comparator output of said data comparator.

15. A hand-held terminal as set forth in claim 14, wherein said in and out lists printed on said printed material are represented by two dimensional bar codes.

16. A hand-held terminal as set forth in claim 14, wherein said article information indication means comprises printed matter.

17. A hand-held terminal as set forth in claim 14, wherein said storage racks respectively have associated therewith rack information indication means for indicating information concerning the articles stored in said rack; and said input means reads rack information.

18. A hand-held terminal as set forth in claim 17, wherein said rack information indication means comprises printed matter.

19. A hand-held terminal as set forth in claim 18, wherein said rack information indication means comprises two dimensional bar code labels.

20. A hand-held terminal as set forth in claim 18, wherein each hand-held terminal further has associated therewith rack information generating means for generating rack information and printing means for printing said rack information indication means by printing said rack information, generated by said rack information generating means, on print material.

21. A hand-held terminal as set forth in claim 20, wherein said printing means of each hand-held terminal outputs the results of the in and out storage operations indicated by said in and out lists.

22. A hand-held terminal as set forth in claim 14, wherein said data comparator judges whether or not articles, indicated by said rack information indication means, are included in said in and out lists and said display displays information of the corresponding articles which are indicated by said rack information indication means to be included in said in and out lists.

23. A hand-held terminal as set forth in claim 22, wherein said information of the corresponding articles, displayed on said display is automatically deleted from said in and out lists.

24. A hand-held terminal as set forth in claim 22, wherein said information of the corresponding articles, displayed on said display is deleted from said in and out lists in response to an operator's indication.

25. A hand-held terminal as set forth in claim 14, wherein said input means comprises at least a selected one of a scanner and keyboard.

* * * * *